P. E. SHIPP.
GATE.
APPLICATION FILED FEB. 15, 1915.

1,182,717.

Patented May 9, 1916.
3 SHEETS—SHEET 2.

WITNESSES:

INVENTOR
PAUL E. SHIPP,
BY Munn & Co.
ATTORNEYS

P. E. SHIPP.
GATE.
APPLICATION FILED FEB. 15, 1915.
1,182,717.
Patented May 9, 1916.
3 SHEETS—SHEET 3.
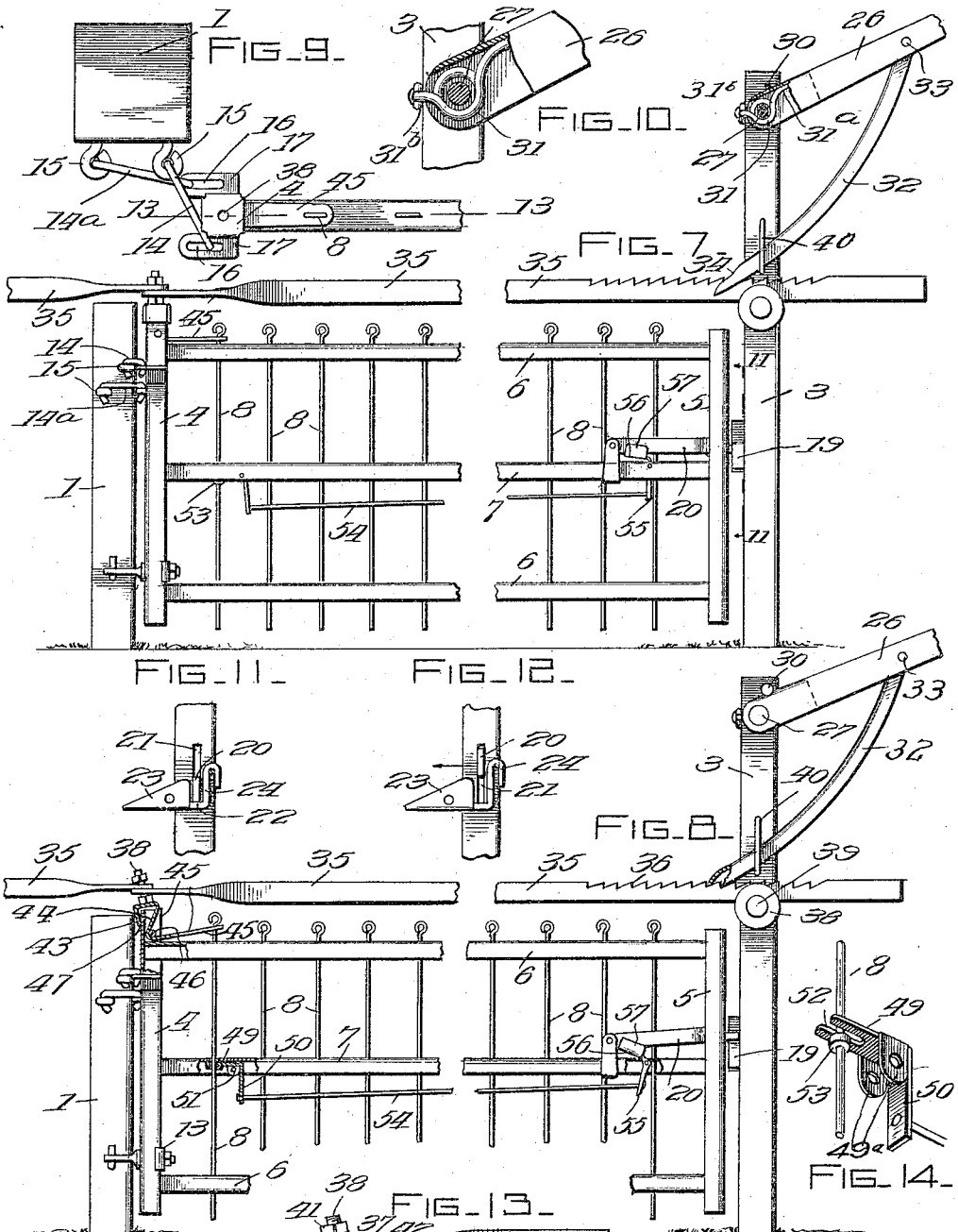
WITNESSES:
INVENTOR
PAUL E. SHIPP,
BY Munn & Co.
ATTORNEYS

UNITED STATES PATENT OFFICE.

PAUL E. SHIPP, OF LEXINGTON, KENTUCKY.

GATE.

1,182,717. Specification of Letters Patent. Patented May 9, 1916.

Application filed February 15, 1915. Serial No. 8,245.

*To all whom it may concern:*

Be it known that I, PAUL E. SHIPP, a citizen of the United States, and a resident of Lexington, in the county of Fayette and State of Kentucky, have invented a new and useful Improvement in Gates, of which the following is a specification.

My invention is an improvement in gates, and has for its object to provide a gate arranged to swing in either direction from closed to open position, and having mechanism in connection with the gate adapted to be operated at a distance from the gate for opening and closing the gate, the said mechanism being arranged at opposite sides of the gate, and arranged to open or close the gate in accordance with the position of the gate at the time the said mechanism is operated.

Figure 1:
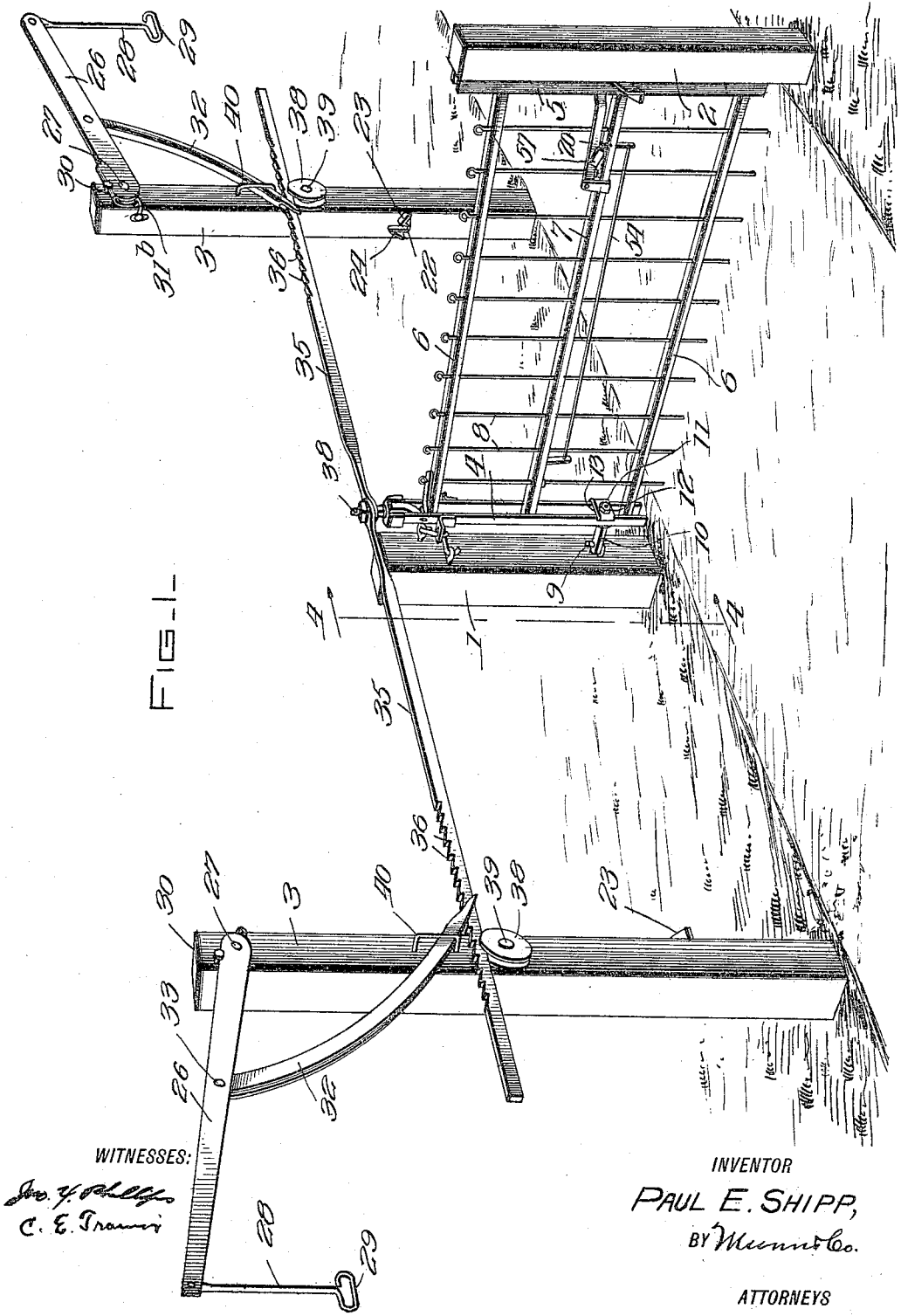
Figure 2:
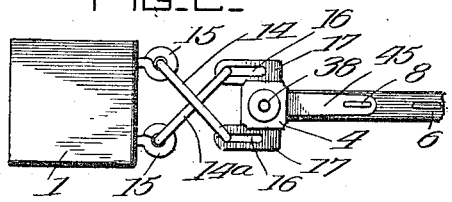
Figure 3:
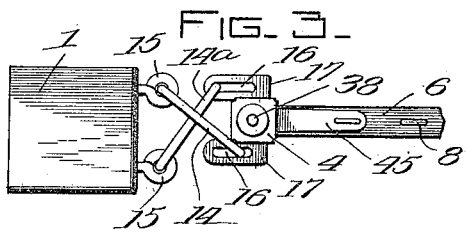
Figure 4:
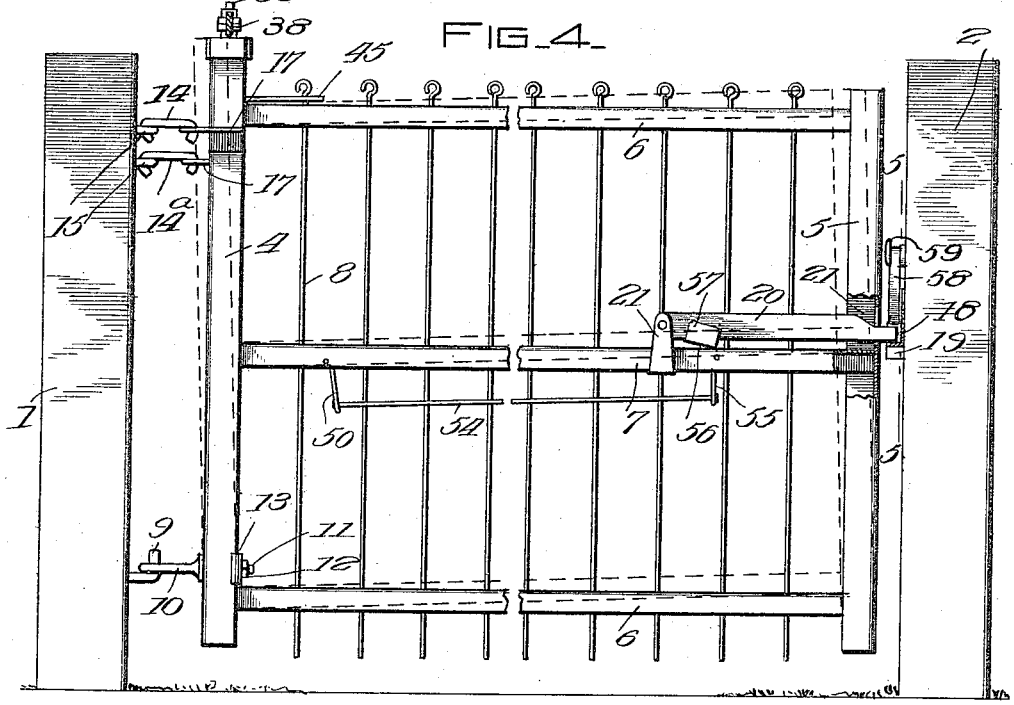
Figure 5:
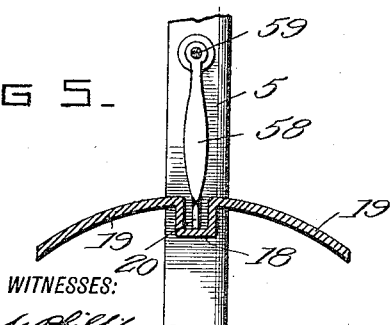
Figure 6:
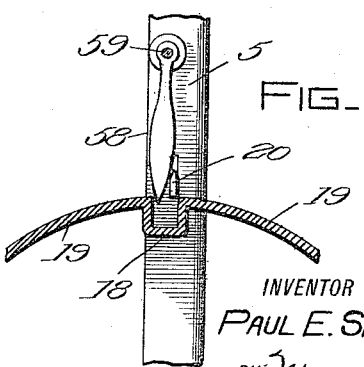

In the drawings:—Figure 1 is a perspective view of the improved gate, Fig. 2 is a top plan view of the upper hinge showing the parts in one position, Fig. 3 is a similar view, showing the parts in another position, Fig. 4 is a section on the line 4—4 of Fig. 1, looking in the direction of the arrows adjacent to the line, Fig. 5 is a section on the line 5—5 of Fig. 4, showing the parts in one position, Fig. 6 is a view similar to Fig. 5, showing the parts in another position, Fig. 7 is a partial front view of the gate, showing the mechanism in one position, Fig. 8 is a similar view with the parts in another position, Fig. 9 is a view similar to Fig. 2 with the gate open, Fig. 10 is an enlarged detail section of a portion of the operating mechanism, Fig. 11 is a section on the line 11—11 of Fig. 7, Fig. 12 is a view similar to Fig. 11, showing the parts in another position. Fig. 13 is a section on the line 13—13 of Fig. 9, and Fig. 14 is a perspective view of a part of the latch operating mechanism.

The present embodiment of the invention is shown in connection with posts 1 and 2, the gate being hinged to the post 1 and closing against the post 2. Other posts or standards 3 are arranged at opposite sides of the gate and in approximately the same plane with the post 1, the said posts or standards 3 supporting the operating mechanism for the gate.

The gate is composed of end posts 4 and 5, respectively, of channel material, and arranged with their channels inwardly, and upper and lower connecting bars 6, and an intermediate connecting bar 7. The connecting bars 6 and 7 are also of channel material arranged with their channels downward and the ends of the connecting bars 6 and 7 are received within the channels of the bars 4 and 5, and secured thereto in any suitable manner, and the gate is completed by pickets 8 arranged in vertical position and engaging registering openings in the bars 6 and 7.

The gate is hinged to the post 1 by upper and lower hinges, the lower hinge being an ordinary pin and strap connection, the pin 9 being secured to the post 1, while the strap 10, having an eye for engaging the pin, has also a threaded stem 11, which is passed through the body of the channel post 4, and is engaged by a nut 12, on the opposite side of the post, a channel plate 13, being arranged transversely of the channel for the nut to bear against.

The upper hinge consists of two links 14 and 14ª, arranged at different levels, each link having a hook at each end, one of the hooks engaging the eye of an eye bolt 15 on the post 1, while the other hook engages a slot 16 in one of the portions of an angle plate 17 secured to the opposite side of the gate. The links 14 and 14ª are alike, but they are crossed as shown in Figs. 2 and 3, the said links occupying the position shown in Fig. 2, when the gate is in normal position.

The slots 16 are in horizontal portions of the angle plates, and the said portions are extended beyond that face of the post 4, which is adjacent to the post 1, and each link 14—14ª engages the eye bolt 15 at the opposite side of the gate from the plate 17, which the said link engages. With this arrangement the gate 10 tends to normally occupy the position shown in Fig. 1, that is, the normal position of the gate between the posts 1 and 2.

Latch mechanism is provided for holding the gate closed, and other latch mechanism is provided for holding the gate open at either post or standard 3. The first-mentioned mechanism is shown in Figs. 5 and 6, and the mechanism comprises a guide having a central notch or channel 18, and curved wings 19, the channel or notch being at the post 2, while the wings extend on each side of the post. The guide, taken as a whole, is arc-shape or curved, and is arranged with its convex surface upwardly, the notch or catch 18 being at the center of the guide.

The guide is of angular material as shown, consisting of two portions extending at a right angle to each other, one of the said portions being secured to the post and the other extending horizontally therefrom, and it is the horizontal portion that serves as a guide.

A latch plate 20 is connected with the gate, the said plate being arranged at the central bar 7, and one end of the latch plate is pivoted between a pair of upstanding lugs 21 on the bar 7. The other end of the latch extends between the side walls of the channel post 5 of the gate, and through a vertical slot 22 in the body of the post beyond the adjacent end of the gate, the said end of the plate being reduced on its upper side as shown in Fig. 4, and the said end of the latch is adapted to engage within the notch 18 to hold the gate closed.

The latch mechanisms on the post or standard 3 are the same, each consisting of a notch or recess 22, and an incline 23 leading to the notch or recess, each notch or recess having a stop 24 at the opposite side from the incline. When the gate is opened the latch plate 20 engages the incline 23 and this incline acts as a cam to lift the latch, and to cause the latch to ride into the notch or recess 22, while the stop 24 in rear of the notch or recess prevents movement of the latch beyond the notch or recess.

The opening mechanism for the gate which is arranged at each standard 3, consists of a lever 26, pivoted at one end to the post or standard 3, as indicated at 27, and extending outwardly from the post or standard in the opposite direction to the gate. A link 28 is pivoted to the outer end of each lever, each link depending in position to be grasped by the driver of a vehicle passing along the road or by a horseman, and each link has a handle 29 at its lower end.

The upward movement of each lever is limited by a stop in the form of a pin 30, connected with the post or standard above the lever, and each lever is normally forced upward by a spring, as shown more particularly in Figs. 7 and 10. Each lever as shown in the said figures is of channel material adjacent to the post 3, arranged with the channel downward, and the pivot pin 27 of the gate passes through the opposite side walls of the channel.

The spring comprises a coil 31 encircling the pivot pin 27 and having one end 31$^a$ engaging the body of the channel lever, the other end 31$^b$ of the spring being secured to the post. Each spring presses against the lever, and normally holds the lever in contact with the stop 30.

An arc-shaped pawl 32 is connected to each lever, and each pawl is of channel material, arranged with the channel on the convex edge of the pawl, and with the concave edge toward the post. One end of each pawl is received between the opposite side walls of the lever, and is pivoted to the said side walls as indicated at 33, and at its opposite end each pawl has the body portion cut away for some distance as indicated at 34, and the opposite side walls of the pawl engage over a ratchet or rack bar 35.

The body at the inner end of the cutaway portion engages the teeth 36 of the ratchet bar, and it will be evident that when the free end of either lever 26 is swung downwardly, the pawl 32 connected therewith will tend to move the ratchet bar 35 which the said pawl engages toward the opposite post 3. The inner ends of the ratchet bars are given a quarter turn as shown, and each of the said ends has an eye 37, which fits over a bolt 38 connected with the gate. The teeth 36 of the ratchet bars face outwardly and each ratchet bar is supported at the end remote from the gate by a grooved pulley 38, journaled on the post 3, by means of a journal pin 39.

Each pawl is guided at the point where it engages the ratchet teeth by means of a staple 40, connected with the adjacent post, and each pawl passes through the adjacent staple. The bolt 38 is threaded throughout its length, and the eyes 37 of the ratchet bars 35 are arranged between nuts 41 and 42 on the bolt, the nut 41 being above the eyes and the nut 42 below.

Below the nut 42 the bolt passes through an opening in an angular bearing lug 43 on one of the arms of an elbow lever, consisting of two arms 44 and 45, arranged at an acute angle with respect to each other, within the channel of the post 4 of the gate. The arm 44 extends approximately vertical between the side walls of the channel and the arm 45 extends above the uppermost bar 6 to a connection with the first picket 8 of the series connected with the gate. Each of the pickets 8 has an eye at its upper end and the first picket of the series adjacent to the post 4 passes through an opening in the outer end of the arm 45.

A pin 46 is arranged transversely of the side walls of the channel bar 4 at the connection between the arms 44 and 45 of the elbow lever, and the elbow lever swings upon this pin. The lug 43 of the arm 44 of the elbow lever has at its outer end a depending lug 47, fitting outside of the body of the channel bar 4, and limiting the swinging movement of the elbow lever in one direction. The movement in the other direction is limited by the engagement of a nut 48 with the body of the channel bar, the nut being threaded on to the bolt 38 below the bearing lug 43.

It will be evident that when either ratchet bar 35 is moved longitudinally by means of the pawl coöperating therewith, the post 4 will be swung away from that standard 3 upon which the operating pawl is mounted. As for instance, in Fig. 1, when the lever 26 at the left of the figure is swung downwardly, the ratchet bar adjacent thereto is moved toward the opposite standard 3, and the upper end of the post 4 will be swung in the same direction. When however, the post 4 is swung in either direction, it is also moved toward the post 1, because of the shortening of the effective length of the links 14 and 14$^a$.

Referring to Figs. 2, 3 and 4, it will be seen that when the upper end of the post 4 is swung laterally in either direction one of the links is shortened as regards its effective length because it is swung at a greater angle with respect to the plane of the gate, while the other is lengthened because it is swung nearer into coincidence with the plane of the gate. This relative change in the link does not however, affect the gate so far as tending to swing the gate is concerned, because of the slot connection between the link and the gate, and the shortening of the link is to swing the upper end of the post 4 toward the post 1, as indicated in dotted lines in Fig. 4. The ratchet bars 35 do not however, act directly on the body, acting first on the elbow lever 44—45 to swing the arm 45 thereof upwardly. The upward swinging of this arm lifts the picket 8 connected thereto, the said picket being mounted to move vertical in the bars 6 and 7, and the pin is connected at the bar with one of the arms of an elbow lever.

The lever consists of arms 49 and 50, arranged at a right angle with respect to each other and pivoted on a pin 51, which connects the side walls of the channel bar 7. The arm 49 extends approximately horizontal between the side walls and the said arm has a longitudinal slot or recess 52, through which the picket extends, and a stop 53 in the form of a collar is secured to the picket on the under side of the arm. The said arm 49 is also provided with a pair of perforated lugs 49$^a$, for engaging the pin 51, and a link 54 connects the arm 50 of the elbow lever with one of the arms 55 of another elbow lever pivoted between the side walls of the channel bar near the opposite end of the gate. This elbow lever consists of the arm 55 and an arm 56, extending below the latch plate 20 before mentioned. The arms 56 of the elbow lever has a pair of laterally spaced upstanding wings 57, which engage on opposite sides of the plate to prevent disengagement of the arm from the latch plate.

It will be evident from the description that when either ratchet bar 35 is moved longitudinally toward the gate, when the gate is in normal position, the upper end of the post 4 will be swung in the same direction as the ratchet bar is moved, and because of the upper hinge arrangement the said upper end of the post 4 will be swung toward the post 1, lifting the post 5 at the opposite end of the gate, and disengaging the latch 20 from the guide 18. When the latch is in engagement with either guide 22—23—24 of a standard 3, the initial movement of the ratchet bar adjacent to the said guide will swing the elbow lever 44—45 in a direction to lift the picket 8 connected to the elbow lever and to cause the said picket to operate the elbow lever 55—56 to disengage the latch, and the gate will swing into closed position by gravity.

The operation of the gate, as a whole, is as follows:—With the parts in the position of Fig. 1 a person approaching from either direction and desiring to open the gate will pull down on that link 28 which is adjacent to the said person. As the outer end of the lever 26 is depressed the pawl 32 connected therewith, will move the adjacent ratchet bar 35 longitudinally toward the gate, and as the link 28 is released the spring 31—31$^a$—31$^b$ will return the lever to normal position into engagement with the stop 30, the pawl 32 slipping idly over the teeth 36 of the ratchet bar. The above-described movement of the ratchet bar will swing the upper end of the post 4 of the gate toward the opposite standard 3, and because of the peculiar construction of the hinge at the top of the said post, the post will at the same time be moved toward the post 1. Because of this movement of the upper end of the post 4 toward the post 1, the post 5 will be lifted to disengage the latch 20 from the guide 18, and the further movement of the ratchet bar will swing the gate open. When either ratchet bar is moved as before stated, and the upper end of the post 4 is pushed toward the opposite standard 3, one of the links 14—14$^a$ is tightened and the other loosened.

Referring to Figs. 2 and 3, it will be seen that when the upper end of the post 4 is pushed toward the top of the sheet the link 14$^a$ is placed under tension, while the link 14 is loosened, the end of the link adjacent to the gate slipping to the remote end of the slot 16. This tends to swing the gate toward the opposite standard 3, and the gate will swing until the latch plate engages the guide or cam 32 and rides up the cam into the notch 22. The person in question now rides or drives through the gate, and as he passes the standard 3 at the other side of the gate he makes traction on the link 28 of the lever pivoted to the standard. The swinging down of the free end of the lever causes the pawl 32 to engage and move the adjacent ratchet bar 35 in the opposite direction or toward the gate. The initial movement of the ratchet bar swings the elbow lever 54—55 to cause the elbow lever 55—56 to release the latch from the notch 22 of the guide 22—23—24. At this time the parts occupy the relative position shown in Fig. 9, and it will be evident that when the upper end of the post 4 is pushed to the left of the said figure the gate will be swung into closed position, that is, toward the post 2, and as the latch 20 engages the guide 19 it will ride up the guide into the notch 18, this latching the gate. Thus when the gate is closed the pulling down of the free end of either lever 26 will open the gate, and when the gate is open the pulling down of that lever 26 remote from the gate will close the gate. Mechanism is also provided to prevent excess movement of the gate from open to closed position. This mechanism as shown in Figs. 5 to 6 comprises a plate 58, pivoted to the post 2, as indicated at 59, just above the notch 18.

It will be noticed from an inspection of Figs. 5 and 6 that the lower end of the plate 58 is wedge shaped, and the upper edge of the latch 20 at this point is also wedge shaped or beveled in opposite directions. The plate 58 is so arranged with respect to the notch 18 of the guide 18—19 that the lower end thereof will engage the side walls of the notch, that is, the said lower end swings in the notch. When the gate is closed from either side, as the gate approaches the post 2 the outer end of the latch 20 will strike the adjacent side edge of the plate 58 and the plate will swing to the opposite side of the notch 18, striking the said side, and acting as a positive stop to check further movement of the gate in that direction. The latch will immediately drop into the notch 18, thus locking the gate in closed position. Because of the wedge shape of the upper edge of the latch and the lower end of the plate whenever the latch is lifted it will move the plate to one side or the other to permit the latch to open. The stops 24 perform the same function for the guides 22—23, that is, the said stops limit the opening movement of the gate.

The springs in connection with the levers 26 return them to normal position, so that they are always in position to be operated to open the gate. The pawl slips idly over the teeth of the ratchet bars during the return movement of the lever, and the grooved wheels 38 guide the ratchet bars and support them during their movement and when in normal position.

A single movement of either ratchet bar toward the gate releases the latch, and swings the gate, regardless of whether the gate is open or closed. The plate 58 is a keeper for preventing accidental disengagement of the latch from the guide, and in addition the plate is a stop for engagement by the gate when in proper position for the latch to engage the guide.

Should too great force be exerted on either lever it will not swing the gate too far, because of this plate. The peculiar construction of the upper hinge is essential to the proper opening of the gate. Whenever the upper end of the post 4 is pushed in either direction one link is tightened and the other is loosened, and since these links are crossed it will be evident that the gate tends to swing on the tightened link. Furthermore the said links hold the gate exactly upright when it is closed, and there is no tendency of the gate to lean in either direction. The hinge is in fact a gravity hinge and were there no latches at the standards 3 the gate would close of its own accord when released.

The staples 40 are so arranged that in addition to their function as guides and guards for the pawls, they have another function, namely, to hold the pawl normally out of engagement with the teeth of the ratchet bars. When the lever 26 is in normal position the lower engaging end of the pawl is out of contact with the teeth, and this said end is not brought into contact with the teeth until the lever has moved down a slight distance. Because of this arrangement of the guards and guides 40 neither pawl offers any resistance to the movement of the adjacent ratchet bar, when the said bars are moved by the other pawl. Hence each lever 26 and its pawl 32 is normally independent of the gate and the adjacent ratchet bar.

When the gate is closed, the swinging of either lever 26 will first swing the upper end of the post 4 in the opposite direction from the said lever, which will cause the latch to be disengaged and the ratchet bar will then swing the gate into open position. When the gate is opened and in contact with either standard 3, when the lever 26 of the said standard is depressed the latch is first disengaged through the rocking of the elbow lever 44—45, after which the gate swings by gravity into closed position.

It is obvious that the spring 31 might be, if desired, replaced by a counterweight.

I claim:—

1. In combination, a pair of fixed posts spaced apart laterally from each other, a gate hinged to one post and adapted to close between the posts, the hinge post having a pin near the bottom of the gate and the gate having an eye for engaging the pin, eyes at the top of the hinge post and at opposite sides thereof, plates on the opposite sides of the gate at the level of the eyes, said plates being slotted longitudinally of the gate, a link engaging each eye at one end of the link, and engaging the slot of the plate at the opposite side of the gate, said links being crossed, and being slidable in the slots, a latch plate at the opposite end of the gate, and hinged to the gate at its inner end to permit the outer end to swing vertically, said outer end extending beyond the gate, a guide plate on the opposite post having a notch at its center for engagement by the latch and having curved guides for lifting the latch into engagement with the notch at opposite sides of the notch, an elbow lever arranged at the hinged end of the gate and at the top of the gate and pivoted to the gate at the junction of the arms, one of the said arms extending upwardly and the other extending toward the opposite end of the gate, a connection between the last-named arm and the latch plate for lifting the plate when the lever is rocked to swing the last-named arm upwardly, a standard at each side of the hinge post of the gate and spaced apart therefrom to permit the gate to swing between either of the said standards and the hinge post, a guide on each standard having a notch for engagement by the latch and a cam for lifting the latch into the notch and stop at the opposite side of the notch, a lever pivoted to each standard and extending in the opposite direction from the guide, a spring normally holding each lever lifted, a ratchet bar arranged between each standard and the gate and pivoted to the first-named arm of the elbow lever at its inner end, a roller support on the standard for the other end of the ratchet bar, and a pawl pivoted to each lever and engaging the adjacent ratchet bar for moving the said ratchet bar toward the gate when the lever is swung downwardly.

2. In combination, a pair of fixed posts spaced apart laterally from each other, a gate hinged to one post and adapted to close between the posts, the hinge post having a pin near the bottom of the gate and the gate having an eye for engaging the pin, eyes at the top of the hinge post and at opposite sides thereof, plates on the opposite sides of the gate at the level of the eyes, said plates being slotted longitudinally of the gate, a link engaging each eye at one end of the link, and engaging the slot of the plate at the opposite side of the gate, said links being crossed, and being slidable in the slots, a latch plate at the opposite end of the gate, and hinged to the gate at its inner end to permit the outer end to swing vertically, said outer end extending beyond the gate, a guide plate on the opposite post having a notch at its center for engagement by the latch hand having curved guides for lifting the latch into engagement with the notch at opposite sides of the notch, an elbow lever arranged at the hinged end of the gate and at the top of the gate and pivoted to the gate at the junction of the arms, one of the said arms extending upwardly and the other extending toward the opposite end of the gate, a connection between the last-named arm and the latch plate for lifting the plate when the lever is rocked to swing the last-named arm upwardly, and means at each side of the gate and at opposite sides of the hinge post of the gate for operating the gate, said means being connected to the first-named arm of the elbow lever to operate the latch lifting mechanism when the gate is open to release the latch to permit the gate to swing shut by gravity.

3. In combination, a pair of fixed posts spaced apart laterally from each other, a gate hinged to one post and adapted to close between the posts, the hinge post having a pin near the bottom of the gate and the gate having an eye for engaging the pin, eyes at the top of the hinge post and at opposite sides thereof, plates on the opposite sides of the gate at the level of the eyes, said plates being slotted longitudinally of the gate, a link engaging each eye at one end of the link, and engaging the slot of the plate at the opposite side of the gate, said links being crossed, and being slidable in the slots, a latch plate at the opposite end of the gate, and hinged to the gate at its inner end to permit the outer end to swing vertically, said outer end extending beyond the gate, a guide plate on the opposite post having a notch at its center for engagement by the latch and having curved guides for lifting the latch into engagement with the notch at opposite sides of the notch, an elbow lever arranged at the hinged end of the gate and at the top of the gate and pivoted to the gate at the junction of the arms, one of the said arms extending upwardly and the other extending toward the opposite end of the gate, a connection between the last-named arm and the latch plate for lifting the plate when the lever is rocked to swing the last-named arm upwardly, and a common means connected with the first-named arm of the elbow lever for swinging the said lever and for swinging the gate.

4. In combination, a pair of fixed posts spaced apart laterally from each other, a gate hinged to one post and adapted to close between the posts, the hinge post having a pin near the bottom of the gate and the gate having an eye for engaging the pin, eyes at the top of the hinge post and at opposite sides thereof, plates on the opposite sides of the gate at the level of the eyes, said plates being slotted longitudinally of the gate, a link engaging each eye at one end of the link, and engaging the slot of the plate at the opposite side of the gate, said links being crossed, and being slidable in the slots, and means at each side of the gate and adjacent to the hinged post for swinging the gate into open or closed position, each of the said means comprising a standard, a lever pivoted to the standard, a spring normally holding each lever in approximately horizontal position, a ratchet bar between each standard and the gate, each ratchet bar being connected at its inner end to the gate adjacent to the upper hinge, a pawl pivoted to each lever and engaging the teeth of the adjacent ratchet bar to move the said bar toward the gate when the lever is swung downward, and means for guiding each ratchet bar.

5. In combination, a pair of fixed posts spaced apart laterally from each other, a gate hinged to one post and adapted to close between the posts, the hinge post having a pin near the bottom of the gate and the gate having an eye for engaging the pin, eyes at the top of the hinge post and at opposite sides thereof, plates on the opposite sides of the gate at the level of the eyes, said plates being slotted longitudinally of the gate, a link engaging each eye at one end of the link, and engaging the slot of the plate at the opposite side of the gate, said links being crossed, and being slidable in the slots, and means at each side of the gate and adjacent to the hinged post for swinging the gate into open or closed position.

6. In combination, a gate, a pair of posts for the gate, a hinge connection between one of the posts and the adjacent end of the gate, and at the top and the bottom of the gate, the connection at the top comprising a pair of links, each link being pivoted at one end to the post at one side thereof and having a sliding connection at the other end with the gate at the opposite side of the gate, said links being crossed, an elbow lever pivoted to the gate at the hinged end and adjacent to the top thereof, said lever having an arm extending approximately horizontal and an arm extending approximately vertical, means in connection with the lever and the gate for limiting the swinging movement of the lever, a latch for the gate, a guide on the other post for engagement by the latch, said guide having a notch for receiving the latch and having guides at each side thereof for lifting the latch into the notch, a connection between the horizontal arm of the elbow lever and the latch for lifting the latch when the lever arm is lifted, and a plurality of means for simultaneously swinging the gate and the elbow lever, said means being arranged at opposite sides of the gate and at the hinge post, and each of the said means comprising a standard, a lever pivoted to the standard, a spring normally holding the free end of the lever elevated, a ratchet bar between each standard and the gate, each bar being pivoted to the vertical arm of the elbow lever at its inner end, means on the standard for guiding and supporting the outer end, and a pawl pivoted to each lever and engaging the teeth of the adjacent ratchet bar to move the said bar toward the gate when the free end of the lever is depressed.

7. In combination, a gate, a pair of posts for the gate, a hinge connection between one of the posts and the adjacent end of the gate, and at the top and the bottom of the gate, the connection at the top comprising a pair of links, each link being pivoted at one end to the post at one side thereof and having a sliding connection at the other end with the gate at the opposite side of the gate, said links being crossed, an elbow lever pivoted to the gate at the hinged end and adjacent to the top thereof, said lever having an arm extending approximately horizontal and an arm extending approximately vertical, means in connection with the lever and the gate for limiting the swinging movement of the lever, a latch for the gate, a guide on the other post for engagement by the latch, said guide having a notch for receiving the latch and having guides at each side thereof for lifting the latch into the notch, a connection between the horizontal arm of the elbow lever and the latch for lifting the latch when the lever arm is lifted, and a plurality of means for simultaneously swinging the gate and the elbow lever, said means being arranged at opposite sides of the gate and at the hinge post.

8. In combination, a gate, a pair of posts for the gate, a hinge connection between one of the posts and the adjacent end of the gate, and at the top and the bottom of the gate, the connection at the top comprising a pair of links, each link being pivoted at one end to the post at one side thereof and having a sliding connection at the other end with the gate at the opposite side of the gate, said links being crossed, latch mechanism in connection with the gate and the other post for holding the gate closed, said mechanism being releasable, means arranged at each side of the gate and connected with the hinged end of the gate for swinging the top of the gate in the opposite direction to cause the opposite end of the gate to release the latch mechanism, and for swinging the gate into open position, and a connection between each of the said means and the latch mechanism for releasing the said latch mechanism when the gate is in open position.

9. In combination, a gate, a pair of posts for the gate, a hinge connection between one of the posts and the adjacent end of the gate, and at the top and the bottom of the gate, the connection at the top comprising a pair of links, each link being pivoted at one end to the post at one side thereof and having a sliding connection at the other end with the gate at the opposite side of the gate, said links being crossed.

10. In combination, a gate, a pair of posts for the gate, a hinge connection between one of the posts and the adjacent end of the gate, and at the top and the bottom of the gate, the connection at the top comprising cross links pivoted to the gate and the post, releasable latch mechanism in connection with the gate and the other post for holding the gate closed, means arranged at each side of the gate and connected with the gate for swinging the top of the gate in the opposite direction to cause the opposite end of the gate to release the latch mechanism, and for swinging the gate into open position, means at opposite sides of the gate and coöperating with the latch mechanism to hold the gate in open position, and a connection between each of the said swinging means for the gate and the latch mechanism for releasing the said latch mechanism when the gate is in open position.

PAUL E. SHIPP.

Witnesses:
 LARU C. SHIPP,
 J. F. SHIPP.

Copies of this patent may be obtained for five cents each, by addressing the "Commissioner of Patents, Washington, D. C."